(12) United States Patent
Knott et al.

(10) Patent No.: US 7,157,541 B2
(45) Date of Patent: Jan. 2, 2007

(54) PROCESS FOR AN ADDITION REACTION OF ORGANIC SILICON COMPOUNDS HAVING SIH GROUPS WITH COMPOUNDS HAVING OLEFINIC DOUBLE BONDS

(75) Inventors: Wilfried Knott, Essen (DE); Thomas Pott, Essen (DE)

(73) Assignee: Goldschmidt GmbH, Essen (DE)

( * ) Notice: Subject to any disclaimer, the term of this patent is extended or adjusted under 35 U.S.C. 154(b) by 0 days.

(21) Appl. No.: 10/857,660

(22) Filed: May 28, 2004

(65) Prior Publication Data
US 2005/0075468 A1    Apr. 7, 2005

(30) Foreign Application Priority Data
Oct. 4, 2003    (EP) .................................. 03022337

(51) Int. Cl.
*C08G 77/08* (2006.01)

(52) U.S. Cl. ............................. 528/15; 528/25; 528/31

(58) Field of Classification Search ..................... None
See application file for complete search history.

(56) References Cited

U.S. PATENT DOCUMENTS

| | | | |
|---|---|---|---|
| 3,775,452 A | 11/1973 | Karstedt | |
| 3,814,730 A | 6/1974 | Karstedt | |
| 5,142,037 A * | 8/1992 | Yamazaki et al. | 556/479 |
| 5,290,897 A * | 3/1994 | Dougherty | 528/5 |
| 5,410,007 A * | 4/1995 | Lewis et al. | 528/15 |
| 5,756,795 A * | 5/1998 | Bank et al. | 556/479 |
| 6,175,031 B1 * | 1/2001 | Tachikawa | 556/479 |

FOREIGN PATENT DOCUMENTS

| | | |
|---|---|---|
| DE | 26 46 726 | 10/1976 |
| EP | 0 075 703 | 8/1982 |
| WO | WO 98/00463 | 1/1998 |

OTHER PUBLICATIONS

Noll, Walter; "Chemie und Technologie der Silicone", 1968, Verlag Chemie, GmbH, p. 43.
Fleming, Ian; "Grenzorbitale und Reaktionen Organischer Verbindungen", 1979, Verlag Chemie, Weinheim, New York, pp. 136-137.
Steffanut, Pascal, et al; "Efficient Homogeneous Hydrosilylation of Olefins by Use of Complexes of $Pt^0$ With Selected Electron-Dificient Olefins as Ligands"; Chem. Eur. J., 1998, 4, No. 10, pp. 2008-2017.
Houk, K. N.; "Generalized Frontier Orbitals of Alkenes and Dienes; Regioselectivity in Diels-Alder Acivity"; Journal of the American Chemical Society, 98:12, Jun. 13, 1973, pp. 4092-4094.
Sahgal, A., et al.; "Solubility of Ethylene in Several Polar and Non-Polar Solvents"; The Canadian Journal of Chemical Engineering, Jun. 1978, vol. 56, pp. 354-357.

* cited by examiner

*Primary Examiner*—Marc S. Zimmer
(74) *Attorney, Agent, or Firm*—Frommer Lawrence & Haug LLP

(57) ABSTRACT

The invention relates to a process for the preparation of polyorganosiloxanes and polyorganosilanes of high purity by an addition reaction of siloxanes and/or silanes which contain at least one H—Si group with compounds having olefinic double bonds in the presence of a platinum catalyst and optionally further additional components, wherein the reaction is carried out in the presence of a platinum$^{(0)}$ complex catalyst which was dissolved in a solvent before addition to the reaction medium and to whose solution an effective amount of at least one unsaturated hydrocarbon having 2 to 6 carbon atoms was added.

14 Claims, No Drawings

US 7,157,541 B2

PROCESS FOR AN ADDITION REACTION OF ORGANIC SILICON COMPOUNDS HAVING SIH GROUPS WITH COMPOUNDS HAVING OLEFINIC DOUBLE BONDS

RELATED APPLICATIONS

This application claims priority under 35 USC §119 to European application Ser. No. 03022337.4, filed Oct. 4, 2003, herein incorporated by reference.

BACKGROUND OF THE INVENTION

1. Summary of the Invention

The invention relates to a process for an addition reaction of silanes or siloxanes which have SiH groups with compounds having olefinic double bonds in the presence of a dissolved platinum$^{(0)}$ complex catalyst and with an activating amount of at least one unsaturated hydrocarbon.

2. Description of the Art

SiC-linked, organomodified siloxanes, especially polyethersiloxanes, with their widely adjustable surfactant behavior, constitute a class of substances which is very important industrially. The established method for the preparation of these substances is the platinum metal-catalyzed addition reaction of siloxanes and silanes having SiH groups with olefinically functionalized compounds, such as, for example, with allylpolyethers.

The use of platinum catalysts for the addition reaction of silanes or siloxanes having SiH groups with compounds having one or more olefinic double bonds is known (hydrosilylation) and is described, for example, in the book "Chemie und Technologie der Silicone [Chemistry and technology of the silicones]", Verlag Chemie, 1960, page 43, and in the patent literature, for example in DE-A-26 46 726, EP-A-0 075 703 and U.S. Pat. No. 3,775,452. In present-day industrial practice, predominantly hexachloroplatinic acid and cis-diammineplatinum(II) chloride have become established.

Although this reaction principle is simple to describe, it is often complicated to carry out in a reproducible manner on an industrial scale.

On the one hand, this addition reaction takes place without significant formation of byproducts only when the compounds which have olefinic double bonds are free of groups which can react with the SiH group in competition with the addition reaction. In particular, the hydroxyl group bonded to carbon is to be included among these.

On the other hand, the required amounts of platinum metal in parts by weight per million parts by weight of the hydrosilylation mixture in order to obtain usable results are frequently so high that these processes are of no commercial interest.

In particular, however, poor SiH conversions lead to an undesired increase in molecular weight owing to the formation of new SiOSi bonds. As a consequence of this crosslinking, the viscosity of these products cannot be kept in the specified ranges.

Even active catalyst systems, such as, for example, those of the Karstedt type (U.S. Pat. No. 3,814,730), tend toward deactivation and cut-out phenomena in the preparation of organomodified siloxanes, in particular of allylpolyethersiloxanes, so that subsequent catalysis and/or also the drastic temperature increase in the addition reaction are often necessary.

In some cases, it is also found that it is disadvantageous for the hydrosilylation if the known platinum catalysts are used above the normal amounts by weight of catalyst and/or at high temperatures. As a result of these harsher reaction conditions, the formation of rearranged byproducts is forced.

WO-A-98/00463 describes defined solid compounds having high decomposition temperatures (144.3° C. and 138.4° C.), which, starting from the Karstedt catalyst and with addition of selected electron-poor olefins, are said to be an active and at the same time stable catalyst system for homogeneous hydrosilylation. The increased activity is attributed to the introduction of strong $\pi$-acid ligands, such as in particular methylnaphthoquinone or tetraethyltetracarboxylatoethylene.

In the examples mentioned, triethylsilane is subjected to an addition reaction with vinyltrimethylsilane, the olefin component being used in 100% excess. In spite of this large excess and taking into account the fact that the vinyl group, in contrast to the allyl group, does not have isomerization activity, the catalyst switches off here with deactivation at 50° C. after 2 hours, the SiH conversion reaching only 68%. At 73° C., this catalyst system decomposes immediately and leads only to 18% SiH conversion (P Steffanut et al., Chem. Eur. J. 1998, 4, No. 10, page 2014).

All measures mentioned at the outset for increasing the SiH conversion have to date had only an adverse effect on the achievable product quality with regard to sensory and technical properties.

The practical usability of products which arise from the platinum metal-catalyzed addition reaction of siloxanes carrying SiH groups with compounds having olefinic double bonds is in particular directly linked to the conversion achieved in the hydrosilylation, i.e. the minimization of residual SiH functions. Residual SiH leads to uncontrollable hydrolysis and crosslinking processes which, particularly in the case of addition compounds, of high molecular weight, lead to gelling and make the products unusable.

There has been no lack of efforts in practice, particularly in the case of the alkylsiloxane/polyethersiloxane copolymers which are used as emulsifiers and are prepared in a three-stage addition reaction, to trap residual SiH functions by treating the reaction matrix with excess ethylene as an SiH-binding auxiliary olefin. However, this measure does not have the desired efficiency, so that from about 2 to 3% of unconverted silicon hydrogen (based on the starting siloxane) remain. Experience has shown that such a product does not have a long shelf life and suffers gelling.

Particularly sensitive indicators for deviations from the quality level are, for example, those allylpolyethersiloxanes which are used as foam stabilizers in the preparation of flexible PU foams. As performance characteristics, the activity and the fineness of the cells are criteria for assessing the stabilizer quality. Process changes in the stabilizer preparation, such as, for example, the change of the catalysis conditions during the SiC linkage reaction, influence the foam quality.

There is therefore a need for a catalyst which overcomes the disadvantages of the prior art and, on the one hand, has high activity with respect to the addition reaction of the SiH groups at olefinic double bonds and, on the other hand, leads to few secondary reactions, in addition to the abovementioned rearrangement reaction it also being intended to avoid competing reactions in the form of the reaction of the SiH groups with OH groups of the polyethers and also disproportionation reactions within the silane or siloxane compounds used. This is to be understood as meaning a redistribution of the SiH groups in the silane or siloxane usually present in the mixture. A technical problem to be solved is defined in particular as also being able to carry out the SiC linkage reaction at low temperatures as quantitatively as possible and in a reliably stable manner, also in conventional steel reactors.

Surprisingly, it has now been found that all difficulties discussed at the outset and familiar to a person skilled in the art in the case of the SiC linkage reaction can be eliminated if the auxiliary olefins are added to the reaction mixture not after the end of the addition reaction but before the addition of platinum$^{(0)}$ complex catalyst solutions, in particular commercially available Karstedt complexes, these are treated with effective amounts of activating $C_{2-6}$-Olefins and are added to the reaction mixture, and the hydrosilylation is carried out at moderate temperatures, preferably from about 20° C. to about 150° C., but in particular below about 60° C. A highly active platinum catalyst which can be safely handled and results in a quantitative SiH conversion in the desired reaction without further additional measures is thus obtained.

DESCRIPTION OF THE INVENTION

The invention therefore relates to a process for the preparation of polyorganosiloxanes and polyorganosilanes of high purity by an addition reaction of siloxanes and/or silanes which contain at least one H—Si group with compounds having olefinic double bonds in the presence of a platinum catalyst and optionally further additional components, wherein the reaction is carried out in the presence of a platinum$^{(0)}$ complex catalyst which was dissolved in a solvent before addition to the reaction medium and to whose solution an effective amount of at least one unsaturated hydrocarbon having 2 to 6 carbon atoms was added.

The invention furthermore relates to a process for the activation of platinum$^{(0)}$ complex catalysts, wherein an effective amount of at least one unsaturated hydrocarbon having 2 to 6 carbon atoms, which is preferably free of electron-attracting substituents, is added to solutions of these catalysts at temperatures which are preferably in the range from about 0° C. to about 30° C.

According to the invention, the effective minimum amount is defined as the amount of olefin which substantially improves the activity of the catalyst used and furthermore permits the reaction to be carried out in times suitable in practice. Activity is understood as meaning the combination of low initiation temperature and the capability of complete conversion of the SiH compounds.

The amounts of activating olefins are advantageously such that the initiation temperature of the hydrosilylation reaction intended according to the invention is from about 20 to 30° C. below the initiation temperature of the hydrosilylation reaction which permits the use of the unactivated platinum$^{(0)}$ complex catalyst itself In particular, however, the amounts are such that the reaction (addition) temperatures are in the range from about 20 to 50° C., amounts which result in initiation temperatures of the catalyst below from about 25 to 30° C. being very particularly preferred. This is ensured as a rule at the saturation concentration of the activating olefin in the respective solvent.

The platinum$^{(0)}$ complex catalysts which can be concomitantly used according to the invention for the activation are the catalysts belonging to the prior art, in particular the known platinum complexes of siloxanes, silanes, organopolysiloxanes and organosilanes with unsaturated hydrocarbon radicals.

According to the invention, Karstedt complexes are particularly preferred as catalysts. Reference is made to U.S. Pat. No. 3,775,452 as a reference for these compounds and the processes for their preparation and is herein incorporated by reference. Complexes having divinyltetramethyldisiloxane radicals are particularly preferred according to the invention.

However, other stable zero-valent platinum-olefin complexes, such as, for example, bis-1,5-cyclooctadieneplatinum$^{(0)}$ and trisnorborneneplatinum$^{(0)}$, tris(hepta-1,6-diene) diplatinum, ($\eta$2,$\eta$2-1,2,6,7-hepta-1,6-diene)($\eta$2-1,2-hepta-1,6-diene)platinum and ($\eta$2-ethylene)($\eta$2,$\eta$2-1,2,6,7-hepta-1,6-diene)platinum, are also suitable.

The activation, according to the invention, of the catalysts is preferably carried out in such a way that a about 0.1 to about 10% strength, preferably about 0.5 to about 5% strength, solution of the catalyst in a solvent or solvent mixture is initially introduced and is treated with an activating olefin, preferably at room temperature, and the mixture is introduced into the hydrosilylation reactant mixture without any further treatment, immediately or optionally after storage, preferably with cooling.

According to the invention, propene, 1-butene, 2-butene, pentenes, hexenes, cyclohexene and in particular ethylene are preferably used as activating olefins. In addition, those substituted ethylenes whose substituents correspond to Houk's definition of X-substituents (electron donor substituents) are suitable as activating ligands (Ian Fleming, Grenzorbitale und Reaktionen organischer Verbindungen [Boundary orbitals and reactions of organic compounds], Verlag Chemie, Weinheim 1979, page 137, and K. N. Houk, J. Am. Chem. Soc. 95,4092 (1973)).

For a person skilled in the art, this finding is completely unexpected since it is in contrast to the experiences and teaching of the prior art. WO-A-98/00463 teaches that electron-poor olefins should be used as exchange ligands for activating the Karstedt complex. However, these substituted ethylenes correspond to Houk's definition of Z-substituents (electron acceptor substituents) (loc.cit.).

It is assumed that the increase in activity which is clearly detectable in the process according to the invention and which is revealed in particular by a drastic reduction in the initiation temperatures in the hydrosilylation as well as in an increased selectivity and in quantitative SiH conversions is caused by a cascade of dissociation and association processes which result in novel platinum$^{(0)}$ species, said cascade being initiated by the olefin treatment. These novel platinum$^{(0)}$ complexes act as surprisingly active catalysts and open up, in a manner not foreseeable for a person skilled in the art, possibilities for the technical realization of hydrosilylation reactions.

The added amount of activated olefin ligands, based on the solution of the catalyst, is chosen so that it is from the least effective concentration to the saturation concentration of the olefin or above this in the solution of the catalyst complex. It was found that the saturation concentration of the olefin in the respective solvent which can be established under atmospheric pressure at room temperature in the system leads with certainty to sufficient activation of the catalyst system.

The ratio of catalysts originally used to the catalyst according to the invention is obtained from the respective concentration/saturation concentration. The saturation concentration of ethylene in various organic solvents is described, for example, by A. Saghal, H. M. La and W. Hayduk in "Solubility of Ethylene in Several Polar and Non-Polar Solvents", The Canadian Journal of Chemical Engineering, Vol. 56, June 1978, p. 354–357.

The respective least effective concentration can be determined in the catalyst system considered by a few simple exploratory experiments.

What is essential for the invention is that the known catalysts of the prior art should be treated with a sufficient amount of an activating olefin. The method as well as the time and the temperature of the treatment are not very critical and can be varied within wide limits.

If desired, or if required for operational or technical reasons, the preferred procedure described above can be modified to meet the respective technical or operational requirements. For example, it is also possible initially to introduce activating olefin together with small amounts of the reactant system, optionally with one or more solvents, into the reactor and then to add the catalyst. This in situ activation can alternatively be effected in one step or successively by a controlled metering of the catalyst precursor. However, the procedure described here is not preferred since it always requires the use of larger amounts of activating olefin.

For establishing the desired catalytic activity and selectivity, mixtures of two or more of the activating olefins may also be used. According to the invention, activity and selectivity are based on the system to be catalyzed in each case.

Suitable solvents to be used according to the invention are all organic solvents which are inert under reaction conditions, in particular hydrocarbons, such as, for example, aliphatic, cycloaliphatic and optionally substituted aromatic hydrocarbons, such as, for example, pentane, hexane, heptane, cyclohexane, methylcyclohexane, decalin, toluene, xylene, etc. Starting materials may also be concomitantly used as solvents provided that they are suitable for keeping sufficient amounts of the catalyst in homogeneous solution.

The catalyst solutions activated according to the invention are used in the system-dependent concentrations customary for hydrosilylation reactions.

The amount of platinum catalyst to be used depends substantially on the reactivity and the molecular weight of the reactants. In general, from about $10^{-2}$ to about $10^{-8}$ mol, preferably from about $10^{-3}$ to about $10^{-6}$ mol, of the catalysts is used in each case per mole of SiH groups in the silane or siloxane.

The catalysts activated according to the invention may be used over a wide temperature range. In order to avoid the product-damaging secondary reactions described in the prior ark the temperature range is preferably chosen to be so low that it represents an acceptable compromise between desired product purity and production performance. The ethylene-activated systems preferred according to the invention surprisingly catalyze very satisfactorily under slightly exothermic conditions from as low as 20° C. In order to achieve higher throughput rates, the reaction temperature can also be considerably increased (up to about 150° C.) without deactivation and cut-out phenomena occurring.

The optimum reaction temperatures are in some cases considerably below the temperatures required in the prior art with the use of the known industrial catalyst systems. According to the prior art, for example, a polysiloxane/polyoxyalkylene block copolymer is prepared by the one-step process at about 100° C. using cis-diammineplatinum (II) chloride as a catalyst (10 ppm of platinum, based on the total batch) whereas the catalyst system claimed according to the invention permits the preparation of this flexible PU foam stabilizer at reaction temperatures as low as ≦36° C. (example 1).

According to the invention, the process is preferably carried out at atmospheric pressure, but pressure ranges differing therefrom are—if desired—also possible.

The reactants, i.e. the silanes or siloxanes having SiH groups and the organic compounds having olefinic double bonds, and processes for their preparation are known. The silanes or siloxanes are described, for example, in the book "Chemie und Technologie der Silicone [Chemistry and technology of the silicones]", Verlag Chemie, 1960.

Examples of suitable organosilicon compounds having SiH groups are:

monomeric silanes, such as, for example, $R_3SiH$; $R_2SiH_2$; $RSiH_3$;

cyclic silanes, such as, for example, $(RHSiO)_4$; $(RHSiO)_3$;

linear or branched oligomeric or polymeric siloxanes, such as $R_3SiO—(R_2SiO—)_a(RSi(H)O—)_bSiR_3$ in which a is ≧0 and b is ≧1; $HR_2SiO—(R_2SiO)_c(RSi(H)O—)_dSiR_2H$, in which c and d are ≧0;

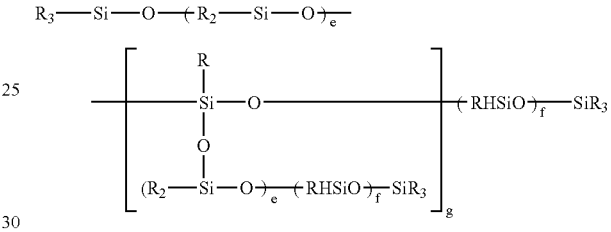

in which
e is ≧0,
f is ≧1 and
g is ≧1.

In the abovementioned formulae, R are groups which do not hinder the addition reaction, such as alkyl groups having 1 to 8 carbon atoms; substituted alkyl groups having 1 to 8 carbon atoms, such as the 3-chloropropyl, 1-chloromethyl or 3-cyanopropyl group; aryl groups, such as the phenyl group; aralkyl groups, such as the benzyl group; alkoxy or alkoxyalkyl groups, such as the ethoxy or ethoxypropyl group. Within a molecule, R may also have different meanings. However, compounds in which all radicals R or the predominant number thereof are a methyl radical are preferred.

Examples of suitable organocarbon compounds having olefinic double bonds are compounds of the formulae

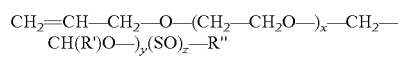

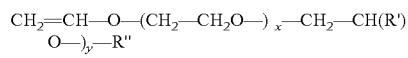

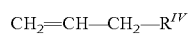

in which
x=0 to 100,
x'=0 or 1,
y=0 to 100,
z=0 to 100,
R' is an optionally substituted alkyl group having 1 to 4 carbon atoms and
R" is a hydrogen radical or an alkyl group having 1 to 4 carbon atoms; the group —C(O)—R'" in which R'"=alkyl radical; the group —CH$_2$—O—R'; an alkylaryl group, such as the benzyl group; the group —C(O)NH—R', R$^{IV}$ is an optionally substituted hydrocarbon radical having 7 to 47, preferably 13 to 37, carbon atoms, and SO is the radical C$_6$H$_5$—CH(-)—CH$_2$—O—.

Furthermore, for example, compounds of the formulae

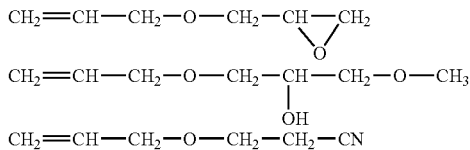

are suitable.

The catalysts activated according to the invention have in particular the following advantages over the catalyst systems described in the prior art:

a) The activated catalyst has, from a temperature as low as 20° C., a catalysis activity as observed in the case of other hydrosilylation catalysts only at substantially higher temperatures. This property is particularly important for industrial practice, since long and expensive heating and cooling phases can be dispensed with when running production batches. This time saving decisively increases the plant capacity and thus the productivity and hence the cost-efficiency.

b) In association with the comparatively low reaction temperatures which permit the use of the catalyst activated according to the invention, thermodynamically favored secondary reactions are greatly suppressed, which is evident in the quality of the reaction products obtained. Greatly reduced formation of the degradation product propionaldehyde is observed, for example in reaction systems which are accessible to an allyl-propenyl arrangement. This lower level of secondary reactions improves not only the olfactory quality of the products obtained (avoidance of the pungent odor sometimes caused by aldehyde contamination) but also helps, for example in the case of the hydroxy-functional silicone polyethers, to avoid an undesired increase in molecular weight due to acetal formation at the aldehyde. The viscosity stability of the products and hence their rheological behavior in the respective applications are therefore ensured.

c) The catalyst activated according to the invention can successfully be used over a very wide temperature range without a loss of activity or cut-out phenomena being recorded. This flexibility with respect to the reaction temperature to be chosen also permits an addition reaction of compounds carrying SiH groups with olefinic substrates which are conventionally kinetically inhibited. For the preparation of demanding SiC linkage products on an industrial scale, in which 2 or more olefinic substrates are subjected to an addition reaction in a multistage process, it is furthermore indispensable that reaction batches which are carried out by the metering method exhibit no undesired increase of reactant concentrations (reactant accumulation) in the vessel. Uncontrollable, sudden exothermic conditions, particularly in the case of SiH-rich systems, can otherwise trigger critical operating states which endanger product quality and work safety. The use of the catalyst claimed according to the invention therefore increases the operational safety.

d) In addition to the avoidance of acetal structures, as discussed above, achieving an SiH conversion which is as quantitative as possible is absolutely essential for assured storage stability of silicone polyether copolymers, in particular of alkylsiloxane/polyethersiloxane copolymers. Otherwise, uncontrollable hydrolysis and condensation reactions of the molecules originally carrying SiH functions lead to a rapid increase in molecular weight, which relatively rapidly results in gelled products and in some cases causes considerable economic damage. Even in a 3-stage hydrosilylation process (without the excess amounts of compounds having olefinic double bonds, which excess amounts are customary and essential with the use of the unactivated catalysts of the prior art), the catalyst according to the invention produces this quantitative SiC linkage, as described in example 5.

e) After the end of the addition reaction by the introduction of catalyst, the products prepared using the catalyst activated according to the invention show no undesired natural color caused by the catalyst.

f) In the preparation of the complex silicone polyethers used as flexible polyurethane foam stabilizers, the catalyst activated according to the invention proves its unusual efficiency in that, in direct comparison with catalysts of the prior ark it ensures not only a fast addition reaction at low temperatures but also very good product properties with respect to activity and cell structure (examples 1 to 3).

The process claimed according to the invention is suitable for the preparation of SiC-linked systems which are used in the area of polyurethane foam stabilizers (e.g.: hot flexible foam, rigid foam, cold foam, ester foam, etc.), which are used as mold release agents (silicone waxes, radiation-curing systems, such as, for example, silicone acrylates, etc.), which are used in paint additives as antifoams, deaerators, lubricant and leveling additives, in applications of wetting agents, in cosmetic formulations for thickeners, emulsifiers, etc.

The process according to the invention is explained in more detail by the following examples. The percentage SiH conversions mentioned in the examples are determined indirectly by treating the reaction product obtained with sodium butylate in n-butanol and volumetrically determining the amount of hydrogen which can still be eliminated.

EXAMPLES

The following non-limiting examples help illustrate the present invention.

Activation, According to the Invention, of a Commercial Catalyst:

10 ml of a 1% strength solution of a commercial Karstedt catalyst [H$_2$C=CH—Si(CH$_3$)$_2$—O—Si (CH$_3$)$_2$—CH=CH$_2$]$_3$Pt$_2$ in toluene were saturated at 25° C. over a period of 5 minutes with ethylene by passing it in.

Example 1

According to the Invention

Preparation of a Polysiloxane/Polyoxyalkylene Block Copolymer (Flexible PU Foam Stabilizer):

80.2 g of a polyether having the average formula:

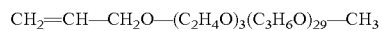

15.1 g of a polyether having the average formula:

40.5 g of a polyether having the average formula:

$CH_2=CH-CH_2O-(C_2H_4O)_{31}(C_3H_6O)-CH_3$ 115.8 g of a polyether having the average formula:

$CH_2=CH-CH_2O-(C_2H_4O)_{31}(C_3H_6O)_{42}-OH$ were initially introduced together with 60 g of a siloxane having the average formula:

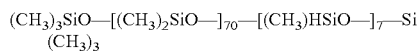
$(CH_3)_3SiO-[(CH_3)_2SiO-]_{70}-[(CH_3)HSiO-]_7-Si(CH_3)_3$ at 25° C. with stirring into a flask which had been rendered inert with argon and was provided with a stirrer, thermometer and reflux condenser, and 0.35 ml (8 ppm of platinum) in the form of the above catalyst prepared according to the invention was added. The reaction matrix consisting of polyethers and hydrogensiloxane was initially two-phase and turbid.

Within a few minutes, the temperature of the reaction mixture increased to 36° C. After about 35 minutes, the previously turbid reaction mixture reaches the clear point, which was optically easily detectable and indicated the end of the reaction. In addition, a gas volumetric SiH determination (decomposition of a weighed-in sample at the gas biuret with the aid of a sodium butylate solution) demonstrated quantitative conversion.

Example 2

Comparative Example

Preparation of a Polysiloxane/Polyoxyalkylene Block Copolymer (Flexible PU Foam Stabilizer):

Using the starting materials from example 1, 80.2 g of a polyether having the average formula:

$CH_2=CH-CH_2O-(C_2H_4O)_3(C_3H_6O)_{29}-CH_3$ 15.1 g of a polyether having the average formula:

$CH_2=CH-CH_2O-(C_2H_4O)_{11}(C_3H_6O)_{16}-CH_3$ 40.5 g of a polyether having the average formula:

$CH_2=CH-CH_2O-(C_2H_4O)_{31}(C_3H_6O)-CH_3$ 115.8 g of a polyether having the average formula:

$CH_2=CH-CH_2O-(C_2H_4O)_{31}(C_3H_6O)_{42}-OH$ were initially introduced together with 60 g of a siloxane having the average formula:

$(CH_3)_3SiO-[(CH_3)_2SiO-]_{70}-[(CH_3)HSiO-]_7-Si(CH_3)_3$ at 25° C. with stirring into a flask which had been rendered inert with argon and was provided with a stirrer, thermometer and reflux condenser, and 0.43 ml (12 ppm of platinum) was added in the form of the Karstedt catalyst [$H_2C=CH-Si(CH_3)_2-O-Si(CH_3)_2-CH=CH_2]_3Pt_2$. The clear point of the reaction mixture was reached after 110 minutes (temperature increase 7° C.), and a gas volumetric SiH conversion of 98% was found after a total reaction time of 120 minutes.

Example 3

Comparative Example

Preparation of a Polysiloxane/Polyoxyalkylene Block Copolymer (Flexible PU Foam Stabilizer):

Analogously to examples 1 and 2, 0.47 ml (13 ppm of Pt) in the form of the 2-methylnaphthoquinone-divinyltetramethyldisiloxan-platinum$^{(0)}$ complex (preparation according to WO-A-98/00463, pages 15 to 17 above) were added to the reaction batch described there. After 140 minutes, only a temperature increased of 3° C. being recorded, the reaction batch reached quantitative conversion on passing through the clear point.

The testing of the performance characteristics of the foam stabilizers prepared is effected using a foam formulation in the following manner:

In each case 300 parts of a commercial polyether for the preparation of flexible polyurethane foams, which had three hydroxyl groups in the average molecule and has a molecular weight of 3500, were mixed with 15 parts of water, 15 parts of a customary physical blowing agent, the corresponding amount of the foam stabilizer to be investigated, 0.33 part of diethylenetriamine and 0.69 part of tin octanoate with thorough stirring. After addition of 189 parts of toluene diisocyanate (isomer mixture of 2.4 and 2.6 in the ratio 4:1), stirring was effected for 7 seconds at 2500 rpm using a Glatt stirrer and the mixture was poured into a box open at the top. A fine-pore foam which is characterized by the following parameters forms:

1. the sag of the foam at the end of the rise phase (the so-called "settling"),
2. the number of cells per centimeter of foam, which is determined microscopically.

The following table gives an overview of the synthesis parameter of the stabilizers obtained in the two working examples not according to the invention and in working example 1 and compares the measured values of the settling for 2 different concentrations (1.8 parts/1.5 parts):

|  | $c_{Pt}$ [ppm] | $t_{Clear\ point}$ [min] | $\Delta T$ [° C.] | Conversion [%] | Settling [cm] | Cells per centimeter |
| --- | --- | --- | --- | --- | --- | --- |
| Working example 1 | 8 | 35 | 11 | 100 | 0.5/1.5 | 14 |
| Comparative example 2 | 12 | 110 | 7 | 98 | 0.9/2.7 | 8 |
| Comparative example 3 | 13 | 140 | 3 | 100 | 0.7/1.7 | 12 |

The determination of the number of cells in the case of the flexible polyurethane foam stabilized with the silicone polyether obtained by the teaching according to the invention is remarkable and is surprising for a person skilled in the art. Here, the morphology of the cell is so uniform that, for the determination of the number of cells per centimeter, it is possible to dispense with the otherwise necessary calculation of the mean value.

Example 4

Preparation of a Polydimethylsiloxane-Allyl Glycidyl Ether Adduct:

Analogously to example 1, 238.4 g of a linear α,ω-dydrogenpolydimethylsiloxane (chain length N=80) were initially introduced with 11.6 g of allyl glycidyl ether with stirring at 25° C. into a round-bottomed flask, and 0.25 ml (9 ppm of Pt) of the catalyst prepared according to the invention was added. After only 15 minutes, the temperature of the reaction matrix had increased to 40° C. Gas volumetric SiH determination demonstrated quantitative conversion.

A batch run under production conditions (catalyst: cis-diammineplatinum(II) chloride (10 ppm of platinum, based on the total batch), 120° C. reaction temperature) required 1 to 3 hours for completion of the reaction.

Example 5

Preparation of an Alkylsiloxane/Polyethersiloxane Copolymer:

In a multinecked flask rendered inert with argon and equipped with a KPG stirrer, dropping funnel and reflux condenser, 0.18 ml of the catalyst solution (12 ppm of Pt) prepared according to the invention were added at 25° C. to 60 g of a siloxane carrying SiH side groups and having the average composition $MD_{75}D^H{}_{25}M$ (SiH content: 3.6 equivalents/kg). 21 g of hexadecene were added dropwise in the course of 18 minutes so that the heat of reaction causes the batch temperature to increased to 64° C. 35.6 g of a polyether having the average composition $CH_2=CH-CH_2O-(C_2H_4O)_8-OH$ (iodine number: 62 g of iodine/100 g) were then rapidly added dropwise in the course of 10 minutes, the reaction temperature decreased to 50° C. After the end of the addition, a further 10.9 g of hexadecene were added in the course of 10 minutes. Gas volumetric SiH determination in a sample of the cooled reaction batch demonstrates quantitative conversion.

Example 6

Preparation of a Trisiloxane Wetting Agent:

142.9 g of a polyether having the average composition $CH_2=CH-CH_2O-(C_2H_4O)_8-OCH_3$ (iodine number: 62 g of iodine/100 g) were initially introduced at 23° C. with stirring into a multinecked round-bottomed flask which had been rendered inert and is equipped with a KPG stirrer, reflux condenser and dropping funnel, and 0.23 ml (10 ppm) of the catalyst prepared according to the invention was added. 60 g of an approx. 74% strength heptamethyltrisiloxane (remainder consists of higher homologs) were added dropwise in the course of 30 minutes so that the temperature of the reaction batch reaches 38° C. After the end of the metering, stirring was continued for about 1 hour, and a gas volumetric SiH conversion of >99% was determined from a sample of the cooled batch.

Example 7

Preparation of a Silicone Release Wax:

Analogously to example 1, 337.5 g of α-olefin C30+ with 28.9 g of 1-hexadecene in 337.5 g of the isoparaffin Cobersol© B56 were initially introduced with stiffing at 57° C. into a round-bottomed flask, and 0.6 ml (10 ppm of Pt) of the catalyst prepared according to the invention was added. 150 g of a siloxane carrying SiH side groups and having the average formula $MD_{1.75}D^H{}_{1.25}M$ were added dropwise to this mixture over a period of 15 min, the temperature of the reaction matrix increased to 69° C. Gas volumetric SiH determination gave a conversion of 93.7% after 2 h and 97.2% after 3 h and 98.8% after 4 h.

The above description of the invention is intended to be illustrative and not limiting. Various changes or modifications in the embodiments described herein may occur to those skilled in the art. These changes can be made without departing from the scope or spirit of the invention.

The invention claimed is:

1. A process for preparing polyorgansiloxanes and polyorganosilanes by an addition reaction which comprises reacting
    at least one siloxane and/or at least one silane, each of which contain at least one H—Si group, with at least one compound having olefinic double bonds in the presence of a platinum$^{(0)}$ catalyst comprising a platinum$^{(0)}$-compound complexed with at least one unsaturated hydrocarbon having 2 to 6 carbon atoms dissolved in a solvent,
    wherein the at least one unsaturated hydrocarbon is selected from the group consisting of ethane, propene, butenes, pentenes, hexenes and cyclohexene
    wherein said platinum$^{(0)}$ catalyst is obtained by dissolving the platinum$^{(0)}$-compound in a solvent and then adding the unsaturated hydrocarbon(s).

2. The process as claimed in claim 1, wherein the platinum$^{(0)}$-compound is a platinum$^{(0)}$ complex of siloxanes, silanes, organopolysiloxanes and/or organosilanes with unsaturated hydrocarbon radicals.

3. The process as claimed in claim 1 wherein the platinum$^{(0)}$-compound is of the formula $[H_2C=CH-Si(CH_3)_2-O-Si(CH_3)_2-CH=CH_2]_3Pt_2$.

4. The process as claimed in claim 1, wherein the solvent for the platinum$^{(0)}$ catalyst is an aromatic hydrocarbon and the Pt$^{(0)}$ content of the solution is from about 0.1 to about 10% by weight.

5. The process as claimed in claim 1, wherein the at least one unsaturated hydrocarbon is ethane, propene or butene.

6. The process as claimed in claim 1, wherein at least one of the unsaturated hydrocarbons is added to the solution of the catalyst at temperature in the range from about 0° C. to about 30° C.

7. The process as claimed in claim 1, wherein the amount of catalyst is from about $10^{-2}$ to about $10^{-8}$ mol per mole of SiH groups in the silane or siloxane.

8. The process as claimed in claim 7, wherein the amount of catalyst is about $10^{-3}$ to $10^{-6}$ mol per mol of SiH groups in the silane or siloxane.

9. The process as claimed in claim 1, wherein the hydrosilylation is carried out at temperatures in the range from about 20 to about 150° C.

10. The process as claimed in claim 1, wherein the siloxane and/or silane is
    monomeric silanes;
    cyclic silanes;
    linear or branched oligomeric or polymeric siloxanes; or compounds of the general formula.

11. The process as claimed in claim 10, wherein the siloxane and/or silane is a compound of the formula
    $R_3SiH$;
    $R_2SiH2$;
    $R_3SiH3$;
    $R_3SiO-(R_2SiO-)_a(RSi(H)O-)_bSiR_3$; or
    $HR_2SiO-(R_2SiO-)_c(RSi(H)O-)_dSiR_2H$;
    in which
    R are identical or different and is an alkyl group having 1 to 8 carbon atoms;
        a substituted alkyl group having 1 to 8 carbon atoms; an aryl group, an aralkyl group, an alkoxy group or an alkoxyalkyl group;
    a is $\geq 0$;
    b is $\geq 1$;

c is $\geq 0$; and d is $\geq 0$.

12. The process according to claim 10 wherein at least one R group is selected from the group consisting of 3-chloropropyl, 1-chloromethyl, 3-cyanopropyl, phenyl, benzyl, ethyoxy and ethoxypropyl.

13. The process as claimed in claim 1, wherein at least one compound having olefinic double bonds is a compound of the formulae $$(CH_2=CH-CH_2-O-(CH_2-CH_2O-)_x-CH_2-CH(R')O-)_y(SO)_z-R'';$$

$$CH_2=CH-O-(CH_2-CH_2O-)_x-CH_2-CH(R')O-)_{y'}-R'';$$

$$CH_2=CH-CH_2-R^{IV}; \text{ or}$$

$$CH_2=CH-(O)_{x'}-R^{IV};$$

in which x=0 to 100, x'=0 or 1, y=0 to 100, z=0 to 100,

R' is an optionally substituted alkyl group having 1 to 4 carbon atoms and

R'' is a hydrogen radical or an alkyl group having 1 to 4 carbon atoms; the group —C(O)—R''' in which R''' is alkyl radical; the group —CH$_2$—O—R'; an alkylaryl group, the group —C(O)NH—R', $R^{IV}$ is an optionally substituted hydrocarbon radical having 7 to 47, carbon atoms, and SO is the radical $C_6H_5$—CH(-)—CH$_2$—O—.

14. The process as claimed in claim 10, wherein the at least one unsaturated hydrocarbon is ethane, propene or butene,

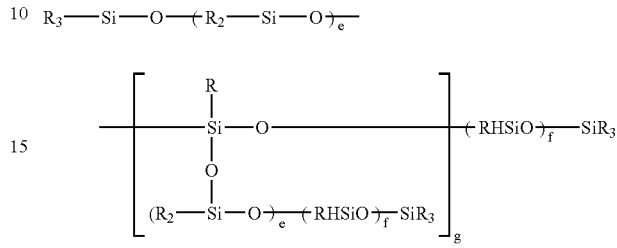

in which e is $\geq 0$ f is $\geq 1$ and g is $\geq 1$,

R are identical or different groups which do not hinder the addition reaction.

* * * * *

UNITED STATES PATENT AND TRADEMARK OFFICE
CERTIFICATE OF CORRECTION

PATENT NO. : 7,157,541 B2  Page 1 of 1
APPLICATION NO. : 10/857660
DATED : January 2, 2007
INVENTOR(S) : Knott et al.

It is certified that error appears in the above-identified patent and that said Letters Patent is hereby corrected as shown below:

1) Column 12, line 16, please replace the word "ethane" with the word --ethene--.

Signed and Sealed this

First Day of May, 2007

JON W. DUDAS
*Director of the United States Patent and Trademark Office*